(12) United States Patent
Yudenfriend et al.

(10) Patent No.: US 11,137,933 B2
(45) Date of Patent: Oct. 5, 2021

(54) ACCELERATING TRANSACTION EXECUTION ACROSS GEOGRAPHICALLY DISPERSED CLUSTERS

(71) Applicant: International Business Machines Corporation, Armonk, NY (US)

(72) Inventors: Harry M. Yudenfriend, Poughkeepsie, NY (US); Dale F. Riedy, Poughkeepsie, NY (US); Scott B. Compton, Hyde Park, NY (US); Nicolas M. Clayton, Warrington (GB); Peter G. Sutton, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 16/175,894

(22) Filed: Oct. 31, 2018

(65) Prior Publication Data
US 2020/0133561 A1 Apr. 30, 2020

(51) Int. Cl.
*G06F 17/00* (2019.01)
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 6,304,913 B1* | 10/2001 | Rune | ................ | H04L 29/12066 709/241 |
| 6,879,939 B1* | 4/2005 | Lang | ................ | G01R 31/31715 702/186 |
| 7,171,338 B1* | 1/2007 | Goguen | .............. | G06F 11/3414 702/186 |
| 8,909,985 B2 | 12/2014 | Sutton et al. | | |

(Continued)

OTHER PUBLICATIONS

"zHyperLink: Low-latency I/O for Db2 on IBM Z and DS8880 storage" by D. Craddock et al., Published in: IBM Journal of Research and Development (vol. 62, Issue: 2/3, Mar.-May 2018), pp. 13:1-13:10 (Year: 2018).*

*Primary Examiner* — Hasanul Mobin
(74) *Attorney, Agent, or Firm* — Nelson IP; Daniel P. Nelson (57) ABSTRACT

A method for accelerating transaction execution across geographically dispersed clusters is disclosed. In one embodiment, such a method includes receiving a request to read data in a data replication system comprising a primary storage system and a secondary storage system in a synchronous mirroring relationship with the primary storage system. The method determines whether at least one of the following conditions is true: (1) the secondary storage system is closer from a communication standpoint; and (2) a high speed communication technology is available to communicate with the secondary storage system that is not available to communicate with the primary storage system. In the event either of the conditions is true, the method directs the request to the secondary storage system. In the event neither of the conditions is true, the method directs the (Continued)

request to the primary storage system. A corresponding system and computer program product are also disclosed.

20 Claims, 6 Drawing Sheets

(56) References Cited

U.S. PATENT DOCUMENTS

| | | | |
|---|---|---|---|
| 9,535,612 B2 | 1/2017 | Best et al. | |
| 2005/0071372 A1* | 3/2005 | Bartfai | G06F 11/2071 |
| 2005/0120189 A1* | 6/2005 | Black | G06F 3/065 |
| | | | 711/165 |
| 2005/0154846 A1* | 7/2005 | Chen | G06F 11/2074 |
| | | | 711/162 |
| 2010/0332401 A1* | 12/2010 | Prahlad | H04L 63/0428 |
| | | | 705/80 |
| 2012/0159097 A1* | 6/2012 | Jennas, II | G06F 3/0611 |
| | | | 711/162 |
| 2013/0036091 A1* | 2/2013 | Provenzano | G06F 16/1844 |
| | | | 707/624 |
| 2014/0325164 A1* | 10/2014 | Thompson | G06F 3/0611 |
| | | | 711/154 |
| 2015/0046668 A1* | 2/2015 | Hyde, II | G06F 3/0689 |
| | | | 711/162 |
| 2015/0067387 A1* | 3/2015 | Liao | G06F 11/1443 |
| | | | 714/6.3 |
| 2015/0293945 A1* | 10/2015 | Amrhein | G06F 16/211 |
| | | | 707/722 |
| 2015/0381726 A1* | 12/2015 | Hathorn | G06F 3/0605 |
| | | | 709/213 |
| 2017/0329557 A1* | 11/2017 | Berger | G06F 3/0605 |
| 2018/0052622 A1 | 2/2018 | Kalos | |

* cited by examiner

ACCELERATING TRANSACTION EXECUTION ACROSS GEOGRAPHICALLY DISPERSED CLUSTERS

BACKGROUND

Field of the Invention

This invention relates to systems and methods for accelerating transaction execution across geographically dispersed clusters.

Background of the Invention

Parallel Sysplex is a clustering technology that enables operating multiple instances of a mainframe operating system as a single system. Clustering may help to improve availability by providing a set of loosely coupled systems for continuous execution of a workload in the event of a hardware or software failure. Parallel Sysplex technology may also help scale to larger databases by providing data sharing across a set of systems that form the cluster. Parallel Sysplex systems may span large distances of up to 200 kilometers. This may be achieved using Geographically Dispersed Parallel Sysplex (GDPS) technology, which is a set of software and hardware features that help to manage system images, monitor for failures, automate recovery, and perform HyperSwaps where appropriate.

When synchronous data replication technologies, such as IBM's Metro Mirror technology, are deployed, disaster recovery capabilities may be achieved across the GDPS system. Synchronous replication introduces the concept of a primary storage system and a secondary storage system. All write operations are performed to the primary storage system. The write operations are not considered complete until the data has been replicated to the secondary storage system. Similarly, all read operations are executed on the primary storage system.

When a primary storage system is located at a first site and a transaction is executed on a host system at a second site, the host system must transmit read requests over a significant distance to reach the primary storage system. Similarly, the data read must travel back from the primary storage system to the host system. The time needed to service the reads requests is approximately ten microseconds per kilometer, for a maximum of two milliseconds. For FICON/zHPF protocols, this performance latency is generally deemed acceptable. However, newer zHyperLink technology has ten times lower latency than FICON/zHPF. Using zHyperLink, transactions executing on host systems at the same site as the primary storage system execute in under 20 microseconds. By contrast, transactions executing on host systems at a site 200 kilometers away from the primary storage system require greater than 2000 microseconds to complete, which is 100 times slower. Customers are generally not willing to accept the larger performance asymmetry that occurs when using GDPS over long distances with zHyperLink.

In view of the foregoing, what are needed are systems and methods to accelerate the execution of transactions across geographically dispersed clusters, particularly when using high speed communication technologies such as zHyperLink.

SUMMARY

The invention has been developed in response to the present state of the art and, in particular, in response to the problems and needs in the art that have not yet been fully solved by currently available systems and methods. Accordingly, the invention has been developed to provide systems and methods to accelerate transaction execution across geographically dispersed clusters. The features and advantages of the invention will become more fully apparent from the following description and appended claims, or may be learned by practice of the invention as set forth hereinafter.

Consistent with the foregoing, a method for accelerating transaction execution across geographically dispersed clusters is disclosed. In one embodiment, such a method includes receiving a request to read data in a data replication system comprising a primary storage system and a secondary storage system in a synchronous mirroring relationship with the primary storage system. The method determines whether at least one of the following conditions is true: (1) the secondary storage system is closer from a communication standpoint; and (2) a high speed communication technology is available to communicate with the secondary storage system that is not available to communicate with the primary storage system. In the event either of the conditions is true, the method directs the request to the secondary storage system. In the event neither of the conditions is true, the method directs the request to the primary storage system.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Figure 1:
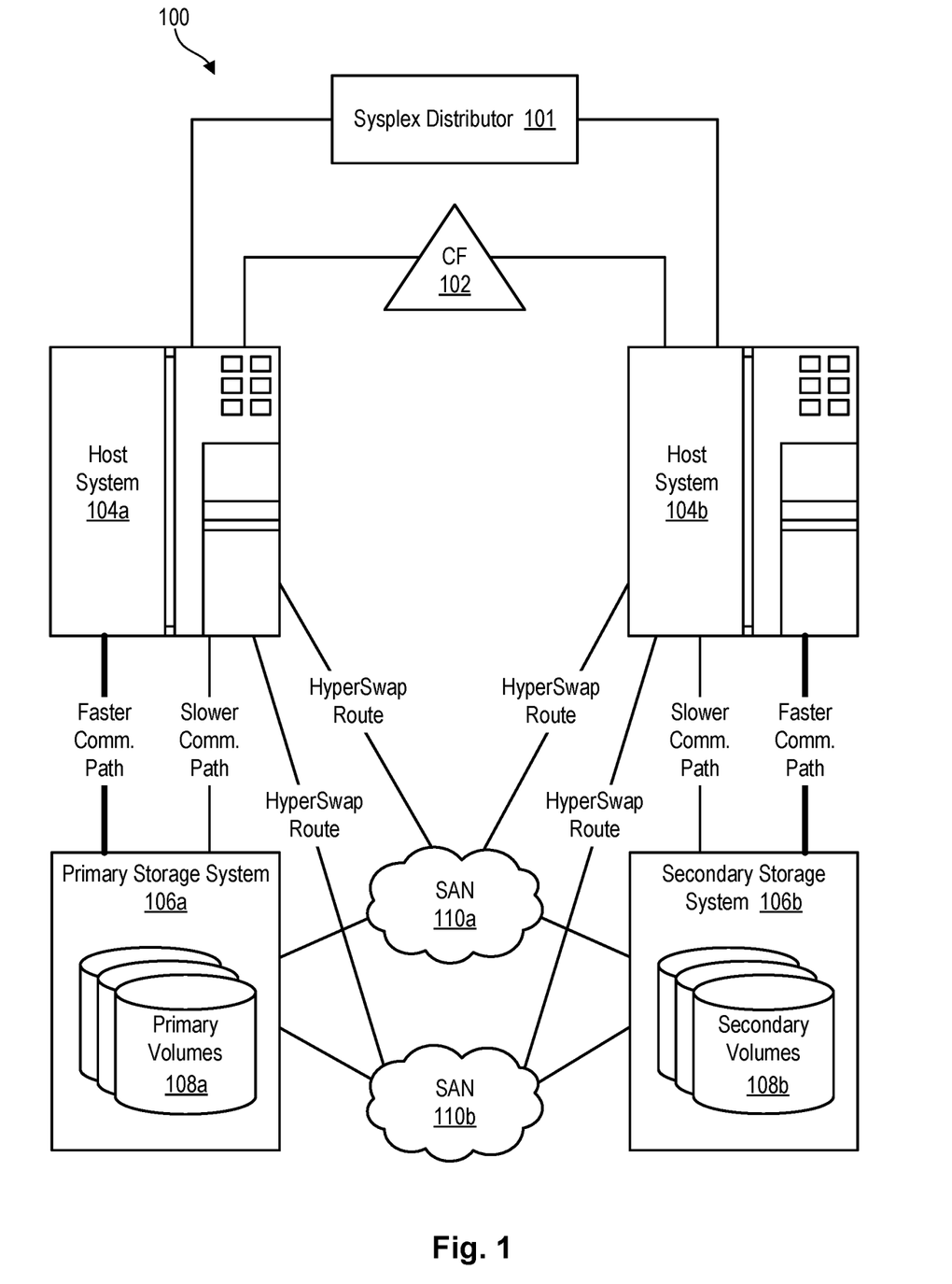
FIG. 1 is a high-level block diagram showing one example of a Geographically Dispersed Parallel Sysplex (GDPS) system.

Referring to FIG. 1, one example of a Geographically Dispersed Parallel Sysplex (GDPS) system 100 is illustrated. The GDPS system 100 is presented to show an example of an architecture in which embodiments of the invention may operate, and is not intended to be limiting. As shown, the GDPS system 100 includes some components (e.g., a host system 104*a* and primary storage system 106*a*) located at a primary site, and other components (e.g., a host system 104*b* and secondary storage system 106*b*) located at a secondary site. The components may communicate with one another through one or more storage-area-network (SAN) fabrics 110*a*, 110*b*. Not all components of the GDPS system 100 are shown for the sake of simplicity.

As shown, the GDPS system 100 is configured to incorporate a data replication system, such as a Peer-to-Peer-Remote-Copy system. In general, the data replication system establishes a mirroring relationship between one or more primary volumes 108*a* and one or more secondary volumes 108*b*. Once this relationship is established, a consistent copy of data is maintained on the volumes 108*a*, 108*b*. The primary and secondary volumes 108*a*, 108*b* may be located on the same storage system 106, although the volumes 108*a*, 108*b* are typically located on separate storage systems 104*a*, 104b located some distance (e.g., several miles to hundreds of miles) from one another. Channel extension equipment may be located between the storage systems 104a, 104b, as needed, to extend the distance over which the storage systems 104a, 104b may communicate.

The data replication system may, in certain embodiments, be configured to operate in either a synchronous or asynchronous manner. For example, when operating synchronously, a write request may only be considered complete when it has completed successfully on both the primary and secondary storage systems 106a, 106b. By contrast, asynchronous operation may only require that the write complete on the primary storage system 106a before the write is considered complete. That is, a write acknowledgement may be returned to a host system 104 when the write has completed on the primary storage system 106a, without requiring that the write also be completed on the secondary storage system 106b. The write may then be mirrored from the primary storage system 106a to the secondary storage system 106b as time and resources allow to create a consistent copy on the secondary storage system 106b.

Each of the primary storage system 106a and secondary storage system 106b may include a cache. Whenever a storage system 106 receives a read request from a host system 104, the storage system 106 may first check its cache to determine whether the requested data is stored therein. If so, the storage system 106 may retrieve the data from its cache and return it to the host system 104. If the data is not stored in its cache, the storage system 106 may fetch the data from its volumes 108 (typically disk and/or solid state drives), return the data to the host system 104, and save it in its cache in the event it is requested again. If the data is requested again by a host 104, the storage system 106 may fetch the data from its cache instead of fetching it from its volumes 108, saving both time and resources.

In a similar manner, when a storage system 106 receives a write request, the storage system 106 may store the write in its cache and destage the write to its volumes 108 at a later time. The write may be considered complete when it is written to its cache as opposed to when it is destaged to its volumes 108. In general, the cache may accelerate reads and writes and generally enhance I/O performance.

In the event the primary storage system 106a fails, I/O may be redirected to the secondary storage system 106b to enable continuous operations. This process may be referred to as a swap or HyperSwap. Since the secondary storage system 106b contains a consistent copy of data on the primary storage system 106a, the redirected I/O (e.g., reads and writes) may be performed on the copy of the data on the secondary storage system 106b. When the primary storage system 106a is repaired or resumes operation, I/O may be redirected to the primary storage system 106a.

In a GDPS system 100 such as that illustrated in FIG. 1, a sysplex distributor 101 may perform load balancing among target host systems 104. As shown, a host system 104a may reside at the primary site and a host system 104b may reside at the secondary site. In performing load balancing, the sysplex distributor 101 may distribute some transactions to the host systems 104a at the primary site and some transactions to the host system 104b at the secondary site. A coupling facility 102, by contrast, may include computer hardware and/or software that enable the host systems 104 to share the same data. In certain embodiments, the coupling facility 102 may include cache to store information shared among the attached host systems 104.

Figure 2:
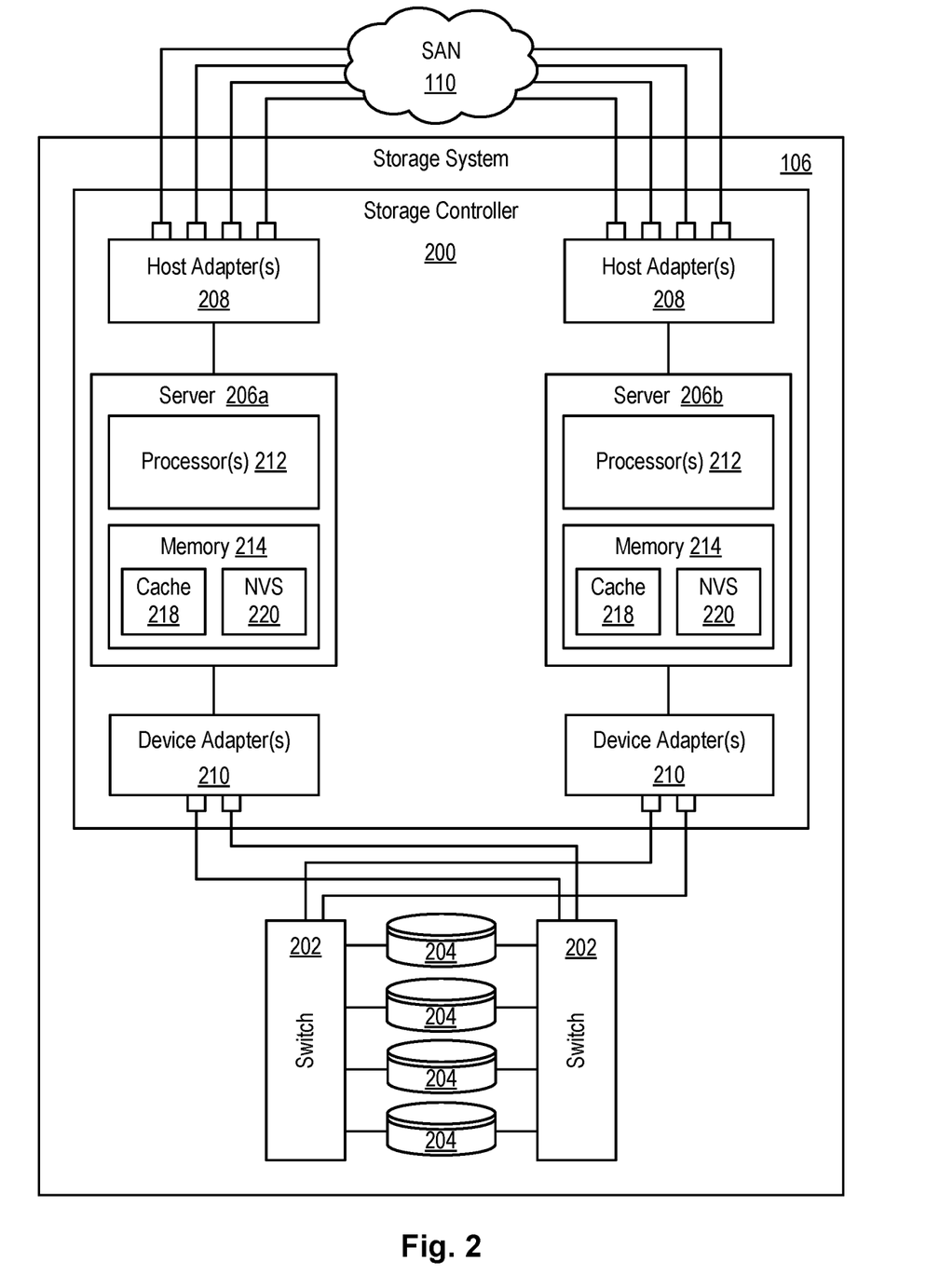
FIG. 2 is a high-level block diagram showing one embodiment of a storage system for use in the GDPS system of FIG. 1.

Referring to FIG. 2, one embodiment of a storage system 106 containing an array of storage drives 204 (e.g., hard-disk drives 204 and/or solid-state drives 204) is illustrated. Such a storage system 106 may be used in the GDPS system 100 illustrated in FIG. 1. The internal components of the storage system 106 are shown since the systems and methods disclosed herein may, in certain embodiments, be implemented within such a storage system 106, although the systems and methods may also be applicable to other storage systems.

As shown, the storage system 106 includes a storage controller 200, one or more switches 202, and one or more storage drives 204 such as hard disk drives and/or solid-state drives (such as flash-memory-based drives). The storage controller 200 may enable one or more hosts 104 (e.g., open system and/or mainframe servers 104) to access data in the one or more storage drives 204. In certain embodiments, the one or more host systems 104 may communicate with the storage system 106 through a storage area network (SAN) 110.

In selected embodiments, the storage controller 200 includes one or more servers 206. The storage controller 200 may also include host adapters 208 and device adapters 210 to connect the storage controller 200 to host systems 104 and storage drives 204, respectively. During normal operation (when both servers 206 are operational), the servers 206 may manage I/O to different logical subsystems (LSSs) within the enterprise storage system 106. For example, in certain configurations, a first server 206a may handle I/O to even LSSs, while a second server 206b may handle I/O to odd LSSs. These servers 206a, 206b may provide redundancy to ensure that data is always available to connected hosts 104. Thus, when one server 206a fails, the other server 206b may pick up the I/O load of the failed server 206a to ensure that I/O is able to continue between the hosts 104 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes 108 in the storage drives 204.

In selected embodiments, the memory 214 includes the previously mentioned cache 218, such as a DRAM cache 218. Whenever a host 104 (e.g., an open system or mainframe server 104) performs a read operation, the server 206 that performs the read may fetch data from the storages drives 204 and save it in its cache 218 in the event it is required again. If the data is requested again by a host 104, the server 206 may fetch the data from the cache 218 instead of fetching it from the storage drives 204, saving both time and resources. Similarly, when a host 104 performs a write, the server 206 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails.

One example of a storage system 106 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 106, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
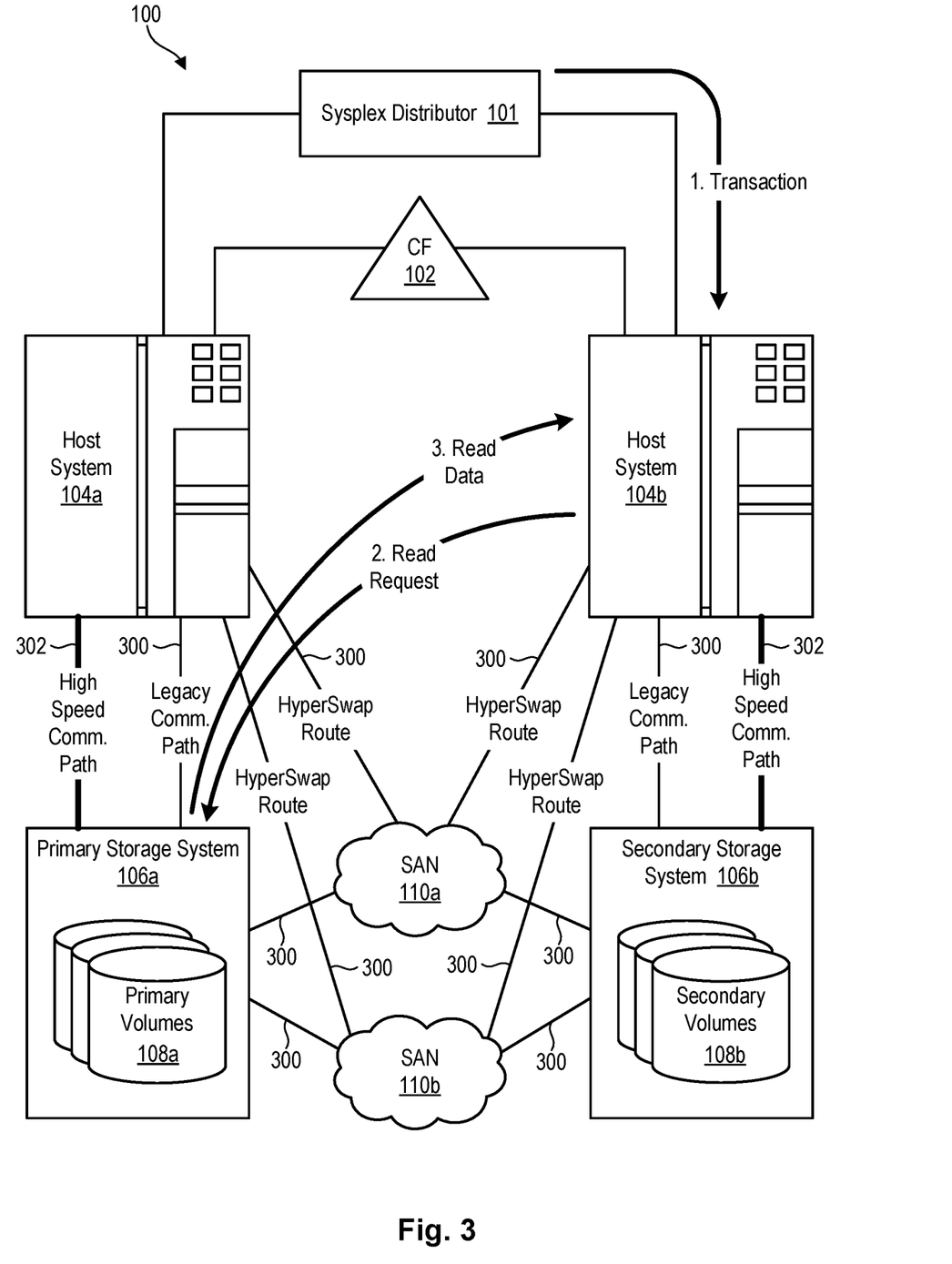
FIG. 3 is a high-level block diagram showing a conventional method for routing a read request from a host system to a primary storage system.

Referring to FIG. 3, when a primary storage system 106*a* is located at a first site and a transaction is executed on a host system 104*b* at a second site, the host system 104*b* must normally transmit read requests over a significant distance to reach the primary storage system 106*a*, as shown in FIG. 3. Similarly, the data read must travel back from the primary storage system 106*a* to the host system 104*b*, as further shown in FIG. 3. The time needed to service the reads requests may be approximately ten microseconds per kilometer, for a maximum of two milliseconds. For legacy communication paths 300 such as those using FICON/zHPF protocols, this performance latency is generally deemed to be acceptable. However, high speed communication paths 302 such as those using newer zHyperLink technology may have ten times lower latency than FICON/zHPF. Using zHyperLink, for example, transactions executing on a host system 104*a* at the same site as a primary storage system 106*a* may execute in under 20 microseconds. By contrast, transactions executing on a host system 104*b* at a site that is 200 kilometers away from the primary storage system 106*a* may require greater than 2000 microseconds to complete, which is 100 times slower. Users are generally not willing to accept the larger performance asymmetry that occurs when using GDPS over long distances with zHyperLink.

Figure 4:
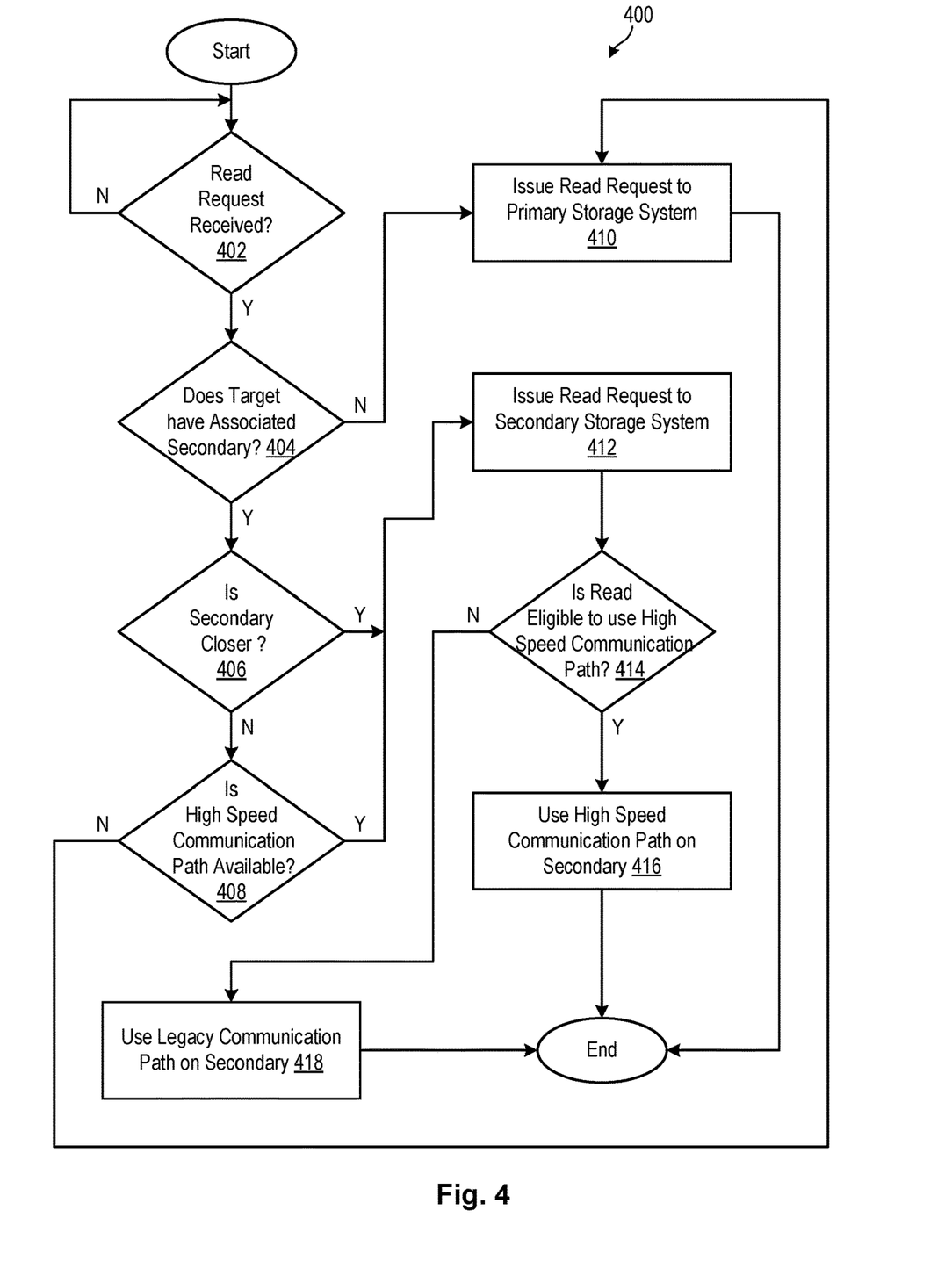
FIG. 4 is a flow diagram showing one embodiment of a method for routing a read request from a host system to a primary storage system and secondary storage system.

Referring to FIG. 4, to address the latency issues described above, particularly when using high speed communication paths 302 such as zHyperLink, read requests generated by a host system 104*b* may, in certain situations, be directed to a secondary storage system 106*b* as opposed to a primary storage system 106*a*. Because the secondary storage system 106*b* stores a consistent copy of data on the primary storage system 106*a*, the same data may exist on the secondary storage system 106*b* and therefore be readable by the host system 104*b*. FIG. 4 shows one embodiment of a method 400 for routing read requests from a host system 104*b* to a secondary storage system 106*b*. Such a method 400 may be executed by a host system 104*b*.

As shown, the host system 104*b* initially determines 402 whether a read request has been received. If so, the host system 104*b* determines 404 whether the primary storage system 106*a* to which the read request would normally be directed is in a synchronous mirroring relationship with a secondary storage system 106*b*. In not, the host system 104*b* issues 410 the read request to the primary storage system 106*a* and the method 400 ends.

If the primary storage system 106*a* is in a synchronous mirroring relationship with a secondary storage system 106*b*, the host system 104*b* determines whether the secondary storage system 106*b* is closer to the host system 104*b* than the primary storage system 106*a* from a communication standpoint. In certain embodiments, this may be determined by sending a command to the primary storage system 106*a* and the secondary storage system 106*b* and waiting for a response from each. The response times from each of the primary storage system 106*a* and secondary storage system 106*b* may then be compared to determine which storage system 106 is "closer" from a communication standpoint.

If the secondary storage system 106*b* is closer to the host system 104, the host system 104 may issue 412 the read request to the secondary storage system 106*b*. If the secondary storage system 106*b* is not closer, the host system 104*b* determines 408 whether it has the ability to communicate with the secondary storage system 106*b* over a high speed communication path 302 (e.g., a zHyperLink communication path 302) that is not also available to communicate with the primary storage system 106*a*. If so, the host system 104*b* issues 412 the read request to the secondary storage system 106*b*. If, at step 408, no high speed communication path 302 is available, the host system 104*b* issues 410 the read request to the primary storage system 106*a* in the conventional manner.

Figure 5:
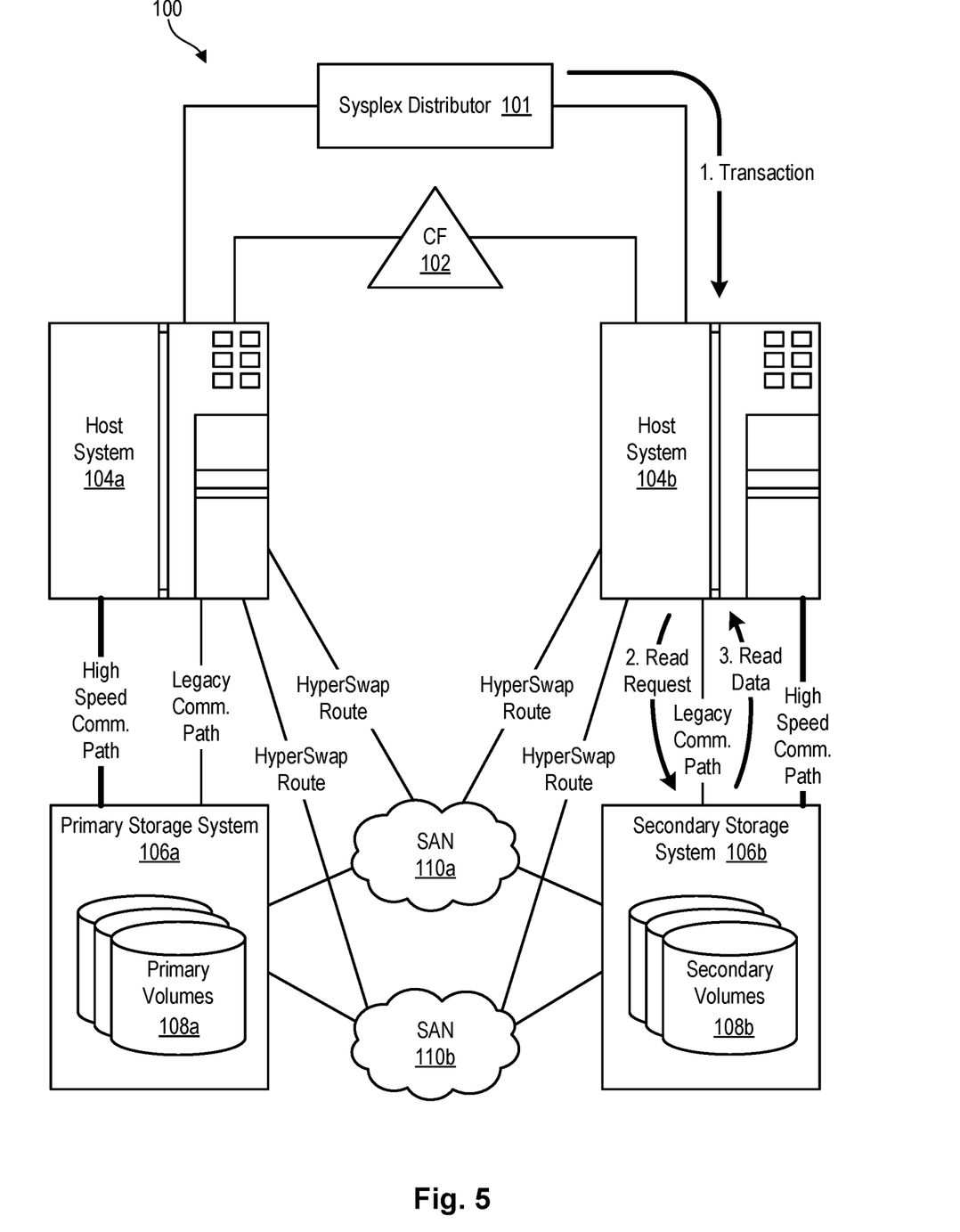
FIG. 5 is a high-level block diagram showing a first example of an improved method for routing a read request from a host system to a secondary storage system.
Figure 6:
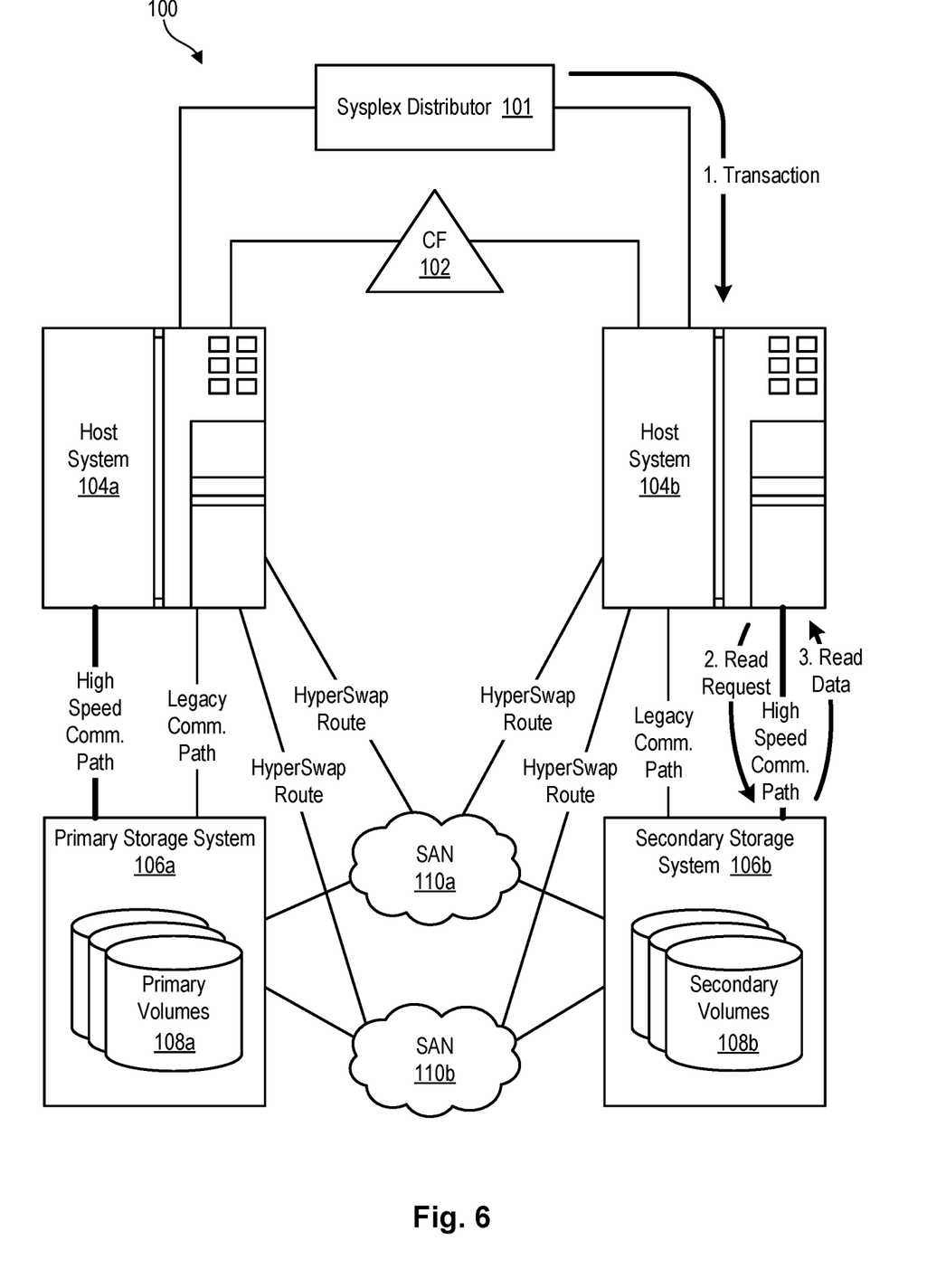
FIG. 6 is a high-level block diagram showing a second example of an improved method for routing a read request from a host system to a secondary storage system.

Once a determination 412 has been made to issue the read request to the secondary storage system 106*b*, the host system 104*b* determines 414 whether the read request is eligible to use the high speed communication path 302. If the read request is associated with certain types of transactions made up of operations that must be executed atomically, or transactions involving certain types of data, or transactions requiring certain locks or serialization, the read request may not be eligible to use the high speed communication path 302. A read request may also not be eligible to use the high speed communication path 302 if requested data is not present in cache of the secondary storage system 106*b*. Where a read request is not eligible to be processed over the high speed communication path 302, the host system 104*b* may use 418 the legacy communication path 300, as illustrated in FIG. 5. Otherwise, the host system 104*b* may use 416 the high speed communication path 302 to process the read request, as illustrated in FIG. 6.

As mentioned above, performing read requests to the secondary storage system 106*b* over high speed communication paths 302 such as zHyperLink may rely on data being present in cache 218 of the secondary storage system 106*b*. Thus, in order to maximize the benefits of zHyperLink on the secondary storage system 106*b*, the cache 218 on each of the primary storage system 106*a* and secondary storage system 106*b* should reflect the overall read workload and not just reads executed on the primary storage system 106*a* or just reads executed on the secondary storage system 106*b*. Therefore, in certain embodiments, the secondary storage system 106*b* and primary storage system 106*a* may periodically exchange information describing the contents of their respective caches 218 so that their caches 218 can be synchronized as much as possible.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for accelerating transaction execution across geographically dispersed clusters, the method comprising:
receiving, by a host system, a request to read data in a data replication system comprising a primary storage system and a secondary storage system in a synchronous mirroring relationship with the primary storage system;
determining, by the host system, whether the host system communicates with the secondary storage system using a high speed communication technology that is at least several times faster than a legacy communication technology that is used to communicate with the primary storage system;
if the host system communicates with the secondary storage system using the high speed communication technology and is only able to communicate with the primary storage system using the legacy communication technology, directing the request to the secondary storage system; and
if the host system does not communicate with the secondary storage system using the high speed communication technology, directing the request to the primary storage system.

2. The method of claim 1, further comprising determining whether the secondary storage system is closer to the host system by comparing a response time between the host system and the secondary storage system, to a response time between the host system and the primary storage system.

3. The method of claim 1, wherein the high speed communication technology is zHyperLink technology.

4. The method of claim 1, further comprising, in the event the request is directed to the secondary storage system, determining whether the request is eligible to be processed using the high speed communication technology.

5. The method of claim 4, further comprising, in the event the request is eligible, processing the request using the high speed communication technology.

6. The method of claim 4, further comprising, in the event the request is not eligible, processing the request using the legacy communication technology.

7. The method of claim 6, wherein the legacy communication technology is one of FICON and zHPF.

8. A computer program product for accelerating transaction execution across geographically dispersed clusters, the computer program product comprising a computer-readable storage medium having computer-usable program code embodied therein, the computer-usable program code configured to perform the following when executed by at least one processor:
receive, by a host system, a request to read data in a data replication system comprising a primary storage system and a secondary storage system in a synchronous mirroring relationship with the primary storage system;
determine, by the host system, whether the host system communicates with the secondary storage system using a high speed communication technology that is at least several times faster than a legacy communication technology that is used to communicate with the primary storage system;
if the host system communicates with the secondary storage system using the high speed communication technology and is only able to communicate with the primary storage system using the legacy communication technology, direct the request to the secondary storage system; and
if the host system does not communicate with the secondary storage system using the high speed communication technology, direct the request to the primary storage system.

9. The computer program product of claim 8, wherein the computer-usable program code is further configured to determine whether the secondary storage system is closer to the host system by comparing a response time between the host system and the secondary storage system, to a response time between the host system and the primary storage system.

10. The computer program product of claim 8, wherein the high speed communication technology is zHyperLink technology.

11. The computer program product of claim 8, wherein the computer-usable program code is further configured to, in the event the request is directed to the secondary storage system, determine whether the request is eligible to be processed using the high speed communication technology.

12. The computer program product of claim 11, wherein the computer-usable program code is further configured to, in the event the request is eligible, process the request using the high speed communication technology.

13. The computer program product of claim 11, wherein the computer-usable program code is further configured to, in the event the request is not eligible, process the request using the legacy communication technology.

14. The computer program product of claim 13, wherein the legacy communication technology is one of FICON and zHPF.

15. A system for accelerating transaction execution across geographically dispersed clusters, the system comprising:
a primary storage system;
a secondary storage system in an asynchronous mirroring relationship with the primary storage system;
the secondary storage system configured to process a read request from a host system in the event the host system communicates with the secondary storage system using a high speed communication technology that is at least several times faster than a legacy communication technology that is used to communicate with the primary storage system; and
the primary storage system configured to process the read request in the event the host system does not communicate with the secondary storage system using the high speed communication technology and is only able to communicate with the primary storage system using the legacy communication technology.

16. The system of claim 15, wherein the secondary storage system is configured to process the read request if a response time between the host system and the secondary storage system is smaller than a response time between the host system and the primary storage system.

17. The system of claim 15, wherein the high speed communication technology is zHyperLink technology.

18. The system of claim 15, wherein the secondary storage system is configured to process the read request based on eligibility of the read request to use the high speed communication technology.

19. The system of claim 18, wherein the secondary storage system is configured to process the read request using the high speed communication technology in the event the read request is eligible.

20. The system of claim 18, wherein the secondary storage system is configured to process the read request using the legacy communication technology in the event the read request is not eligible.

* * * * *